United States Patent [19]

Rowen

[11] 4,084,601
[45] Apr. 18, 1978

[54] SPEED CONTROL VALVE FOR A FLUID OPERATED CLUTCH

[75] Inventor: Harold E. Rowen, Peoria, Ill.

[73] Assignee: Caterpillar Tractor Co., Peoria, Ill.

[21] Appl. No.: 731,967

[22] Filed: Oct. 13, 1976

[51] Int. Cl.² .......................................... G05D 13/34
[52] U.S. Cl. ................................. 137/49; 192/87.12; 192/87.13; 192/103 FA; 192/104 F
[58] Field of Search ............... 137/49, 58; 192/87.12, 192/87.13, 103 FA, 104 F; 415/32; 418/41, 43, 44

[56] References Cited

U.S. PATENT DOCUMENTS

| | | | |
|---|---|---|---|
| 1,387,915 | 8/1921 | Karlsson | 137/49 |
| 2,851,046 | 9/1958 | Nichols | 415/32 |
| 3,757,822 | 6/1972 | Kell | 192/87.12 X |

Primary Examiner—Robert G. Nilson
Attorney, Agent, or Firm—Wegner, Stellman, McCord, Wiles & Wood

[57] ABSTRACT

A control valve for a fluid operated clutch or the like, including a valve body, a first valve mounted for reciprocation in the valve body, a second valve mounted for reciprocation in the valve body and for relative movement with respect to the first valve, one of the valves being concentric with the other, ports in the valves including a throttling port at the interface of the valves, a manual actuator for reciprocally shifting one of the valves, and a rotatable flyweight assembly for reciprocally shifting the other of the valves. Throttled fluid flow from the valve may be directed to a fluid operated clutch to control its capacity and regulate the output speed thereof.

6 Claims, 2 Drawing Figures

SPEED CONTROL VALVE FOR A FLUID OPERATED CLUTCH

BACKGROUND OF THE INVENTION

This invention relates to control valves for fluid operated clutches or the like as, for example, employed in marine propulsion systems.

Prior art of possible relevance includes the following U.S. Pat. Nos. 3,752,281 issued Aug. 14, 1973 to Arnold; and 3,872,956 issued Mar. 25, 1975 to Herr et al.

In certain propulsion systems as, for example, marine drive propulsion systems, one engine is employed to provide motive power as well as to power auxiliary equipment. Frequently, a need arises for a relatively low propulsion drive speed coupled with a need for a relatively high propulsion engine speed for the purpose of driving the auxiliary equipment at a relatively higher speed. Frequently, also, there arises a need for precise control of motive power speed at a constant value.

Typically, fluid operated clutches are utilized and allow varying degrees of slippage between the engine and the motive output, the degree of slippage being controlled to achieve the desired motive output speed. In typical fluid operated clutches utilized for the purpose, the capacity of the clutch is typically regulated by modulating the flow of operating fluid to the clutch. Many systems for modulating the flow of fluid to the clutch are extremely cumbersome and expensive and difficult to maintain. Frequently, they are contained within the clutch unit itself and are not susceptible to easy access for maintenance. In addition, such control systems are not subject to installation in an already existing propulsion system including a fluid operated clutch, thereby requiring the purchase of an entire drive and control system when only the control system may be needed.

SUMMARY OF THE INVENTION

It is the principal object of the invention to provide a new and improved control valve for use with fluid operated clutches. More specifically, it is an object of the invention to provide such a valve wherein maintenance is simplified and wherein the same may be attached to any of a variety of propulsion systems with relative ease.

An exemplary embodiment of a control valve made according to the invention achieves the foregoing objects in a construction including a valve body, a first valve mounted for reciprocation in the body, a second valve mounted for reciprocation in the body and relative to the first valve and wherein the valves have a common interface. Port means are provided in the valves and include a throttling port at the interface. A manual actuator is provided for reciprocally shifting one of the valves and means are provided to be responsive to an angular velocity input axially shifting the other of the valves.

In a preferred embodiment, the two valves are disposed so that one is concentric about the other. Preferably, the angular velocity responsive means forms a rotatable flyweight assembly.

In a highly preferred embodiment the body includes two outlet ports and two inlet ports and a shuttle valve is disposed in the body responsive to the application of fluid under pressure to either of the inlet ports for opening a predetermined one of the outlet ports and closing the other of the outlet ports. The two input ports receive fluid designating forward and reverse directions and the outlet ports are connected to a forward clutch and a reverse clutch in a transmission. The system enables a single flyweight assembly to regulate both forward and reverse speeds.

Other objects and advantages will become apparent from the following specification taken in connection with the accompanying drawings.

DESCRIPTION OF THE PREFERRED EMBODIMENT

Figure 1:
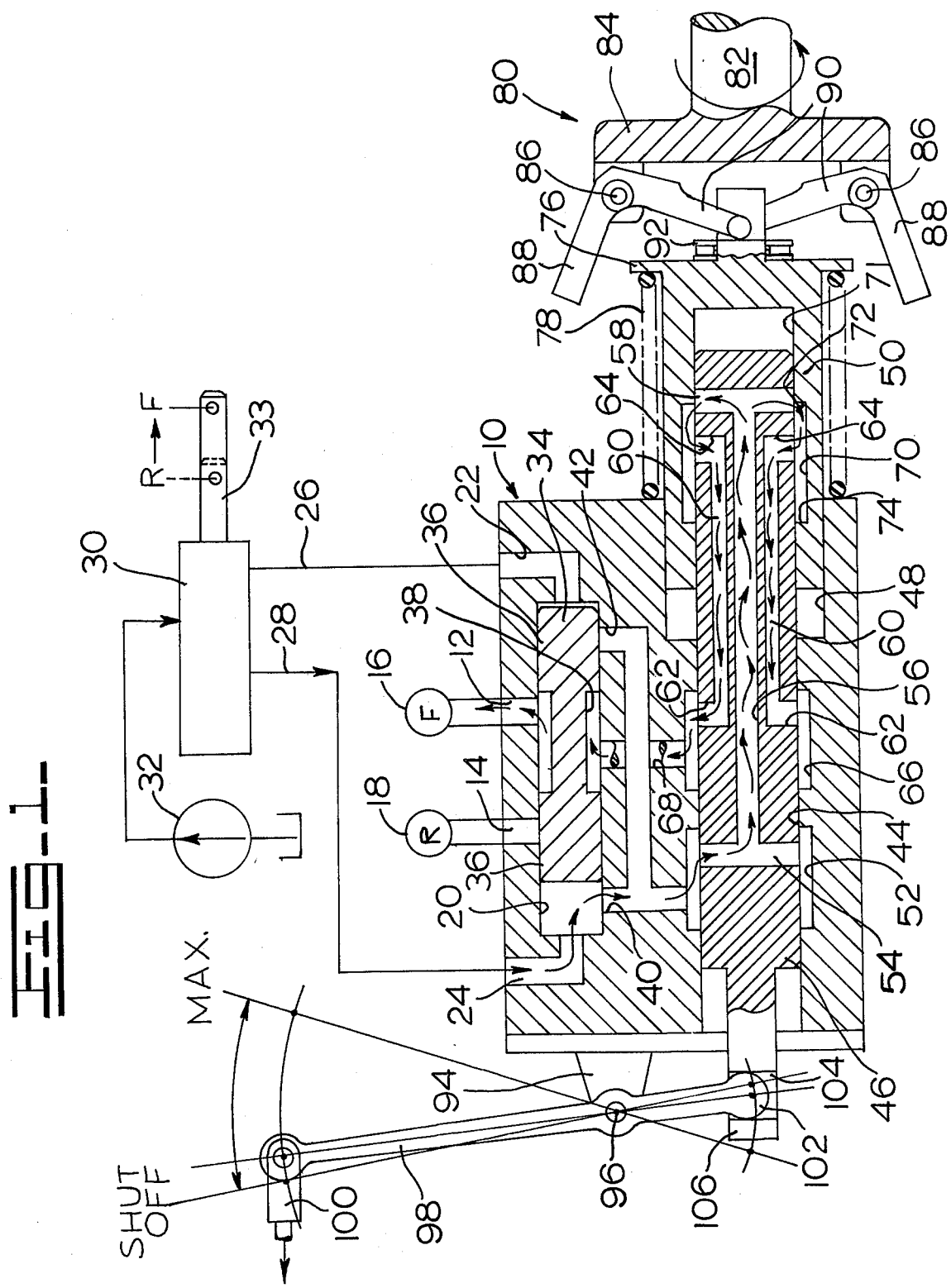
FIG. 1 is a somewhat schematic view in partial section showing the control valve of the present invention and other related components wherein flow of fluid is being throttled.

An exemplary embodiment of a control valve made according to the invention is illustrated in the drawings and with reference thereto, is seen to include a body, generally designated 10. The body 10 has outlet ports 12 and 14 which may be respectively connected to forward and reverse clutches in a propulsion system, schematically indicated at 16 and 18, respectively. The ports 12 and 14 extend to the side of an elongated bore 20 within the body at the locations intermediate its ends and spaced from the center of the bore 20.

The body 10 includes inlet ports 22 and 24 which extend to opposite ends of the bore 20. The ports 22 and 24 are adapted to be connected by lines 26 and 28, respectively, to a selector valve 30 which is supplied with fluid under pressure by a pump 32. The selector valve 30 may be of conventional construction and includes a manual actuator 33 which may be shifted to direct fluid from the pump 32 to either the port 22 or the port 24. When flow is directed to the port 22, reverse propulsion is commanded, while when fluid is directed to the port 24, forward propulsion is commanded.

Within the bore 20 is a spool 34 having lands 36 at its ends and separated by a central groove 38. Adjacent the ends of the bore 20, there is provided a pair of interconnected ports 40 and 42 and, as can be seen from a comparison of FIGS. 1 and 2, the ports 40 and 42 may be alternately closed by lands 36 on the spool 34, depending upon the position of the latter within the bore 20.

The valve body includes a further bore 44 which receives a valve 46 and which terminates at one end in enlarged diameter portion 48. A second valve 50 is disposed in the enlarged diameter portion 48 and concentrically about the valve 46. Both the valve 46 and the valve 50 are axially shiftable, that is, reciprocable, in the valve body 10.

The interconnected ports 40 and 42 are in fluid communication with an annulus 52 in the bore 44. The valve 46 includes a radial passage 54 which is positioned so as to be in fluid communication with the annulus 52 for all positions of movement of the valve 46 within the body 10. The passage 54 is in fluid communication with an axially extending passage 56 which extends almost to the opposite end of the valve 46 and terminates in a radially extending passage 58.

The valve 46 also includes a plurality of angularly spaced, axial passages 60 disposed about the passage 56 and the passages 60, at one end, terminate in radially extending ports 62 and at their opposite ends in radially extending ports 64.

The valve body 10 includes a second annulus 66 which is adapted to be in fluid communication with the ports 62 for all positions of movement of the valve 46 within the body 10. A passage 68 extends from the annulus 66 to the center of the bore 20 and is located so as to be in fluid communication with the groove 38 on the spool 34 for all positions of the spool 34 within the body 10.

The valve 50 includes a radially inwardly opening groove 70 in a bore 71 which receives one end of the valve 46. The groove 70 has an edge 72 which is adapted to cooperate with the port 58 in the valve 46 to provide a throttling action, that is, to modulate the flow of fluid passing from the bore 58 to the groove 70. The opposite side 74 of the groove 70 is located so that, for all positions of the valve 46 within the body 10 and for all positions of the valve 50 with respect to the valve 46, the ports 64 will be fully open.

The valve 50, at its end remote from the valve 46 includes a radially outwardly extending shoulder 76. A coil spring 78 is interposed between the shoulder 76 and the side of the body 10 to urge the valve 50 to the right as viewed in the drawings.

A conventional flyweight assembly, generally designated 80, is provided and includes an input shaft 82 which is adapted to be linked, as by gearing or the like, to the output of the transmission including the clutches 16 and 18, that is, the propulsion shaft to be rotated at some speed proportional to the rate of rotation of the propulsion shaft. The shaft 82 mounts a carrier 84 which in turn mounts, by means of pivots 86, flyweights 88 having arms 90 slidably engaging a bearing-like surface 92 mounted on the valve 50. Those skilled in the art will recognize that the more rapid the rate of rotation of the shaft 82, the greater the centrifugal force generated in the flyweight assembly 80. As a consequence, the flyweights 88 will tend to move outwardly of the axis of the shaft 82 and the arms 90 will move to the left, as viewed in the Figures, to urge the valve 50 to the left against the bias of the spring 78.

The valve body 10 includes a tongue 94 pivotally mounting, at 96, a manual actuator 98. The manual actuator 98 includes a connection to a linkage 100 which may extend to a control area occupied by an operator and further includes, at its opposite end, a spherical formation 102 received in a bore 104 in an arm 106 forming the left-hand end of the valve 46 and extending outwardly of the bore 44 in the body 10.

The actuator 98 serves as an input to the control valve for a commanded output speed of the transmission whose clutches are being controlled by the valve, while the flyweight assemblage 80 serves as a feedback input to the control valve indicating actual output speed. When commanded speed and output speed are not equal, the valve will respond to increase or decrease the speed accordingly by increasing or decreasing the flow of fluid to the appropriate clutch to alter its capacity and its slip appropriately. The manner in which such occurs, follows.

Figure 2:
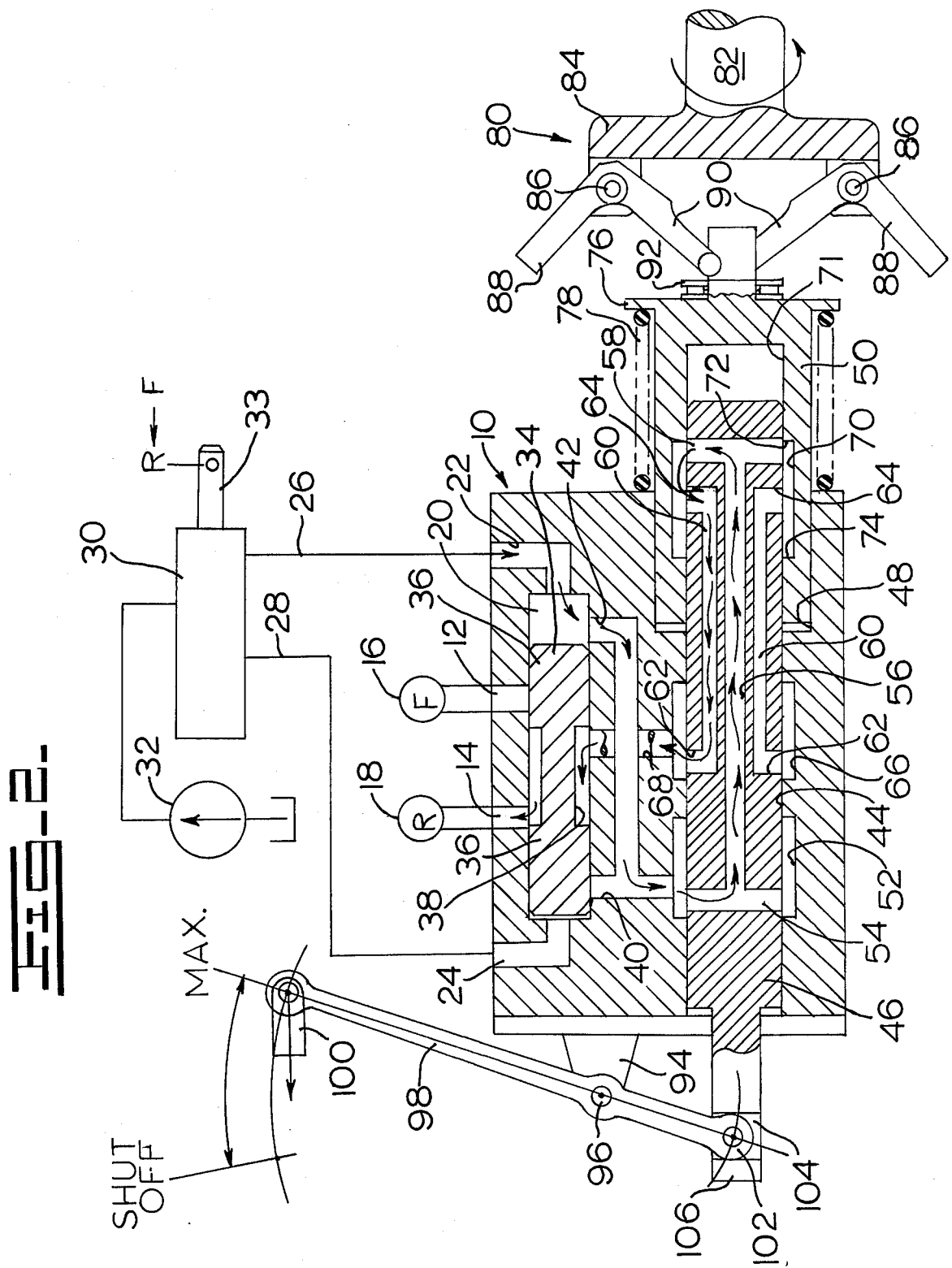
FIG. 2 is a view similar to FIG. 1 wherein the flow of the control fluid is being unimpeded.

Initially, the selector valve 30 is operated to select either the forward or reverse direction, as desired. As seen in FIG. 1, a forward direction has been selected, while as seen in FIG. 2, a reverse direction has been selected. In the case of selection of a forward direction, fluid from the pump 32 is directed through the port 24 and, if the spool valve is not in its rightmost position, the application of fluid to the left-hand end of the same will shift the spool 34 to the right. If a reverse direction is selected, the opposite action will occur via the inlet port 22.

The shifting of the spool 34 to the right in case of forward selection causes the groove 38 to establish fluid communication between the port 68 and the outlet port 12 to the forward clutch 16. Were reverse selected, the shifting of the spool 34 to the left would have established fluid communication in a like manner to the outlet port 14 and the reverse clutch 18.

A particular motive speed is selected and the actuator 98 manipulated accordingly. For low speeds, the valve 46 will be located toward the right in the bore 44, as seen in FIG. 1, while for higher speeds, the valve 46 will be shifted to the left within the bore 44, as seen in FIG. 2.

In either event, fluid will flow from the interconnected ports 40 and 42 to the annulus 52 and into the radial passage 54 within the valve 46. From there, the fluid will flow through the passage 56 and out of the ports 58 into the groove 70 in the valve 50. In the case of any speed other than the maximum speed, throttling of the flow of fluid will occur to a greater or lesser degree at the interface of the valves 44 and 50, that is, at the port 56 and edge 72.

Throttled fluid will then re-enter the valve 46, and the passages 60 therein, from which it will be directed to the annulus 62 and through the passage 68 to the groove 38 and to the appropriate corresponding clutch.

During startup, the flyweight assembly 80 will be stationery, with the result that the valve 50 will be moved to its rightful position by the bias of the spring 78 to decrease the throttling effect at the interface of the two valves. Thus, fluid will be supplied to the appropriate clutch to engage the same to drive the output shaft as well as the shaft 82 of the flyweight assembly 80. As the assembly 80 rotates in unison with the output shaft, centrifugal force generated in the flyweights 88 will result in the application of shifting force to the valve 50, which shifting force will be to the left as viewed in the drawings and in opposition to that of the spring.

As a result, the flow of fluid will be increasingly throttled back until a balance is obtained, at which time the output shaft of the propulsion unit will be rotating at the desired speed. Should an overspeed condition occur, such a fact will be reflected by an increased leftward bias to the valve 50 applied by the flyweight assembly 80 which will result in a further throttling back of the fluid flow to the clutch, thus reducing the capacity of the clutch and increasing its slip so that speed of the output shaft will be retarded and the balance is reattained. Conversely, for an underspeed condition, the spring 78 will move the valve 50 to the right, as viewed in the figure, against the minimal bias applied by the flyweight assembly 80 increasing the flow of fluid to the clutch to thereby increase its capacity and decrease its slip to increase the speed of the output shaft.

Variable speed settings are obtainable, as alluded to previously, by appropriately positioning the valve 46 within the bore 44. As mentioned, for higher speeds, the valve 46 will occupy an increasingly leftward position within the bore. As a result, considerably more bias must be exerted on the valve 50 by the flyweight assembly 80 before any throttling action will occur. Thus, the flyweight assembly 80 must rotate at a more rapid rate before throttling will occur so that a greater volume of fluid will be directed to the clutch to decrease its slip and therefore increase output speed.

It will also be observed that if the actuator 80 is moved to the position labeled "SHUT OFF" in the drawings, the port 58 will be completely closed by the bore 71 in the valve 50, thereby precluding any flow of fluid to the clutch.

From the foregoing, it will be appreciated that a control valve made according to the invention is simple and, therefore, economical in construction. It will be appreciated that th same may be easily installed on existing propulsion units in an independent manner externally of the same to allow for easy servicing or the like. It will also be appreciated that through the unique use of the components, including the spool 34, a single governor is operable for both forward and reverse drives.

What is claimed is:

1. A control valve for a fluid operated clutch or the like, comprising:
   a valve body having an inlet and an outlet;
   a first valve mounted for reciprocation in said body;
   a second valve mounted for reciprocation in said body and relative to said first valve;
   one of said valves being concentrically disposed on an end of the other of said valves and having an internal groove;
   axial passages in said other valve and opening to said groove to define a throttling port at the interface of said valves and to said inlet and said outlet;
   a manual actuator for reciprocally shifting one of said valves; and
   a rotatable flyweight assembly for reciprocally shifting the other of said valves.

2. A control valve for a fluid operated clutch or the like, comprising:
   a valve body having first and second inlets and first and second outlets;
   a bore in said body, said inlets opening to opposite ends of said bore and said outlets opening to said bore intermediate its ends and in spaced relation;
   a spool slidably received in said bore and having lands adjacent its ends separated by a groove intermediate its ends, said spool being dimensioned such that for one extreme position within said bore, one of said lands will block one of said outlets while said groove will be aligned with the other of said outlets, and for another extreme position within said bore, the other of said lands will block said other outlet and said groove will be aligned with said one outlet;
   a pair of interconnected ports in said bore adjacent respective ends thereof;
   a central port in said bore;
   first and second valves movably mounted in said body and having a common interface and being movable relative to each other;
   a throttling port in said valves at said interface; and
   passages in said valves interconnecting said throttling port, in series, with said central port and said interconnected ports.

3. The control valve of claim 2 further including a rotatable flyweight assembly mechanically linked to one of said valves.

4. The control valve of claim 2 wherein said valves are reciprocally received within said valve body and one of said valves is concentrically disposed on the other of said valves.

5. The control valve of claim 4 wherein said passages include two axially extending passages in said other valve, one of said passages having one end in fluid communication with said interconnected ports and its other end opening to said interface, and the other of said passages having one end in fluid communication with said central port and its other end opening to said interface, said one valve throttling fluid flow between said other ends of said two passages.

6. A control valve for a fluid operated clutch or the like, comprising:
   a valve body including two inlet and two outlet ports;
   a shuttle valve in said body responsive to the application of fluid under pressure to either of said inlet ports for opening a predetermined one of said outlet ports and closing the other of said outlet ports;
   a first valve including first valve port means and mounted for reciprocation in said body;
   a second valve including second valve port means and mounted for reciprocation in said body and relative to said first valve;
   said valves having a common interface;
   a throttling port at the interface of said valves;
   a manual actuator for reciprocally shifting one of said valves;
   means responsive to a velocity input for reciprocally shifting the other of said valves; and
   fluid conduit means interconnecting said first and second valve port means to said shuttle valve.

* * * * *